No. 728,677. PATENTED MAY 19, 1903.
J. A. CREASY.
ORE WASHING PAN.
APPLICATION FILED AUG. 9, 1902.
NO MODEL.
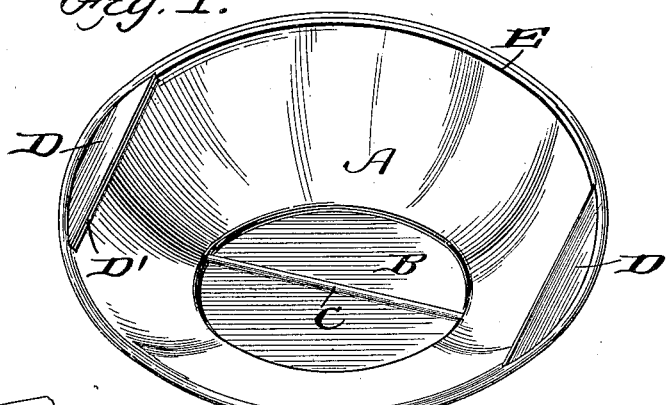
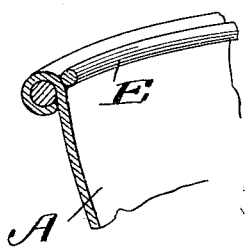
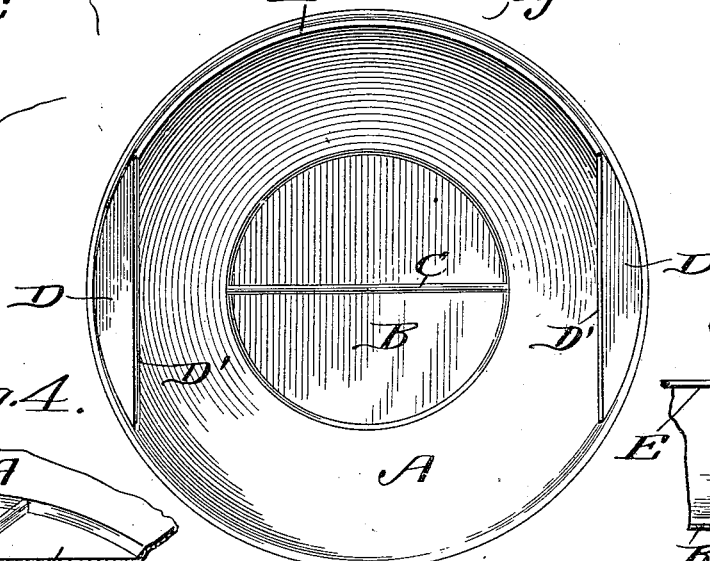
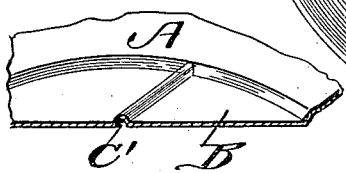
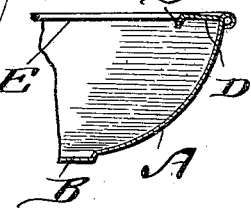
THE NORRIS PETERS CO., PHOTO-LITHO., WASHINGTON, D. C.

No. 728,677. Patented May 19, 1903.

UNITED STATES PATENT OFFICE.

JOHN A. CREASY, OF KANSAS CITY, MISSOURI.

ORE-WASHING PAN.

SPECIFICATION forming part of Letters Patent No. 728,677, dated May 19, 1903.

Application filed August 9, 1902. Serial No. 119,018. (No model.)

*To all whom it may concern:*

Be it known that I, JOHN A. CREASY, a citizen of the United States, residing at Kansas City, in the county of Jackson and State of Missouri, have invented a new and useful Ore-Washing Pan, of which the following is a specification.

This invention is an improved construction of ore-washing pan, the object being to provide a cheap and simple pan for miners' use which will be superior to the pans now in common use; and with this object in view the invention consists, essentially, in providing a pan having riffle-plates at diametrically opposite points along the edge and also a central riffle-bar in the bottom and also a riffle-bar along one edge of the pan and between the riffle-plates.

The invention consists also in certain details of construction and novelties of combination, all of which will be fully described hereinafter and pointed out in the claims.

In the drawings forming a part of this specification, Figure 1 is a perspective view of a pan constructed in accordance with my invention. Fig. 2 is a top plan view. Fig. 3 is a vertical sectional view, and Figs. 4, 5, and 6 show details in section and perspective.

In carrying out my invention I employ a round shallow pan A, having a shallow circular depression B produced centrally in the bottom thereof, and extending across this shallow depression B is a riffle bar or rod C, thus subdividing the shallow depression into two riffles. In practice this riffle bar or rod may be a stout piece of wire, or, if desired, it may be punched up from the bottom of the pan, as shown at C' in Fig. 4. Sector-shaped riffle-plates D are secured to the edges of the pan A at diametrically opposite points, and in practice I prefer to arrange these plates at right angles to the riffle bar or rod C, and each riffle-plate D has a depending flange D' at the inner edge, thus providing a deep flanged riffle or pocket at each edge of the pan. A riffle rod or bar E is also arranged upon the inner side of the pan adjacent to the upper edge thereof and between the two riffle-plates D, this riffle rod or bar E being preferably a stout piece of wire soldered to the pan, as most clearly shown in Fig. 6. It will thus be seen that I provide a pan with two bottom riffles, two oppositely-disposed riffles or pockets at the edges of the pan, and also a riffle bar or rod along one edge of the pan between the riffle-plates. A pan constructed in this manner has been found highly efficient in operation, and the advantages incidental to the peculiarity of construction, combination, and arrangement will be readily appreciated by every one skilled in the art to which it relates.

In operation the light waste material can be rapidly drained off over the unobstructed edge of the pan and the pan rocked so as to throw the heavy material to the side of the riffle C on which the riffle E is located. As the depression B has vertical walls at a sharp angle to the bottom of the pan and the bar C extends from one wall to the other, gold can only get out of the depression by sliding up the inclined sides of the pan, in which case it would strike the inwardly-projecting flange D and be thrown back. These flanges are more than riffle-plates, which are intended to permit certain matter to pass over them, while the flanges act as guards, and the pan is grasped at the sides where these flanges are, the flanges preventing sand, mud, and water from washing over the hands of the operator. The light material having been floated off over the unobstructed side of the pan, the pan is reversed and the heavy material carefully washed over the side having the riffle-rod E.

Having thus fully described my invention, what I claim as new, and desire to secure by Letters Patent of the United States, is—

1. An ore-washing pan having inwardly-projecting sector-shaped flanges arranged on opposite edges of the pan, and a riffle-bar running around one side of the pan from one flange to the other.

2. An ore-washing pan having a central circular depression crossed by a riffle bar or rod, and provided with inwardly-extending flanges at diametrically opposite points along the edge of the pan for the purpose specified.

3. An ore-washing pan having oppositely-disposed flanges secured to the edge of the pan, and a curved riffle bar or rod connected to the pan adjacent to the edge and arranged between the two flanges, as specified.

4. An ore-washing pan having a central circular depression crossed by a riffle bar or rod, the flange-plates attached to the edge of the pan at diametrically opposite points, and a riffle bar or rod attached to the pan adjacent to the edge and between the flange-plates, as specified.

5. An ore-washing pan having a depressed flat bottom, a riffle-bar extending diametrically across said bottom, flanges having straight inner edges arranged on each side of the pan at right angles to the riffle-bar, and a riffle-rod extending around one side of the pan, from one flange to the other.

6. An ore-washing pan having a central depressed flat-bottom portion, said portion being surrounded by walls at a sharp angle to the bottom, a straight riffle-rod extending from one wall to the opposite wall and dividing the depression into equal portions, and a curved riffle-rod extending around one side of the pan, each end of said rod terminating on the same side of the riffle-bar.

7. An ore-washing pan having a riffle-bar across the bottom and inwardly-extending horizontal flanges arranged in the pan adjacent its upper edge, the inner edges of the flanges being at right angles to the riffle-bar, and having straight depending edges at right angles to the horizontal portions.

JOHN A. CREASY.

Witnesses:
WILL E. SMITH,
H. E. BROWN.